United States Patent
Qi et al.

(10) Patent No.: US 8,482,713 B2
(45) Date of Patent: Jul. 9, 2013

(54) LASER PROCESSING OF DISPLAY COMPONENTS FOR ELECTRONIC DEVICES

(75) Inventors: Jun Qi, Cupertino, CA (US); Wayne H. Fu, Mountain View, CA (US); Chenhui Wang, Cupertino, CA (US); Kuanying Lin, Mountain View, CA (US); Nathan K. Gupta, San Francisco, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 13/021,183

(22) Filed: Feb. 4, 2011

(65) Prior Publication Data
US 2012/0200812 A1   Aug. 9, 2012

(51) Int. Cl.
| G02F 1/13 | (2006.01) |
| G02F 1/1335 | (2006.01) |
| B32B 38/04 | (2006.01) |
| B23K 26/38 | (2006.01) |
| B23K 26/00 | (2006.01) |
| B29D 11/00 | (2006.01) |

(52) U.S. Cl.
USPC .......... 349/187; 349/106; 264/1.31; 264/400; 156/267; 219/121.6; 219/121.61; 219/121.67

(58) Field of Classification Search
USPC ............ 349/106, 187, 56; 219/121.6, 121.61, 219/121.62, 121.67, 121.68, 121.69, 121.7, 219/121.71, 121.78; 264/400, 131; 156/267
See application file for complete search history.

(56) References Cited

U.S. PATENT DOCUMENTS

| 5,776,220 A * | 7/1998 | Allaire et al. ............... 65/112 |
| 6,028,288 A | 2/2000 | Moriike |
| 6,379,509 B2 * | 4/2002 | Choi et al. ............. 204/192.29 |
| 6,407,360 B1 * | 6/2002 | Choo et al. ............. 219/121.67 |
| 6,512,196 B1 * | 1/2003 | Yoon et al. ............. 219/121.67 |
| 6,689,544 B2 * | 2/2004 | Nagarkar et al. ........... 430/321 |
| 6,995,916 B2 | 2/2006 | Yamanaka et al. |
| 7,046,312 B2 * | 5/2006 | Koyama et al. ............... 349/40 |
| 7,520,654 B2 | 4/2009 | Freking et al. |
| 7,876,502 B2 | 1/2011 | Ito et al. |
| 7,976,657 B2 | 7/2011 | Kimura et al. |
| 8,034,209 B2 | 10/2011 | Danner et al. |

(Continued)

FOREIGN PATENT DOCUMENTS
EP 1122584 10/2007

OTHER PUBLICATIONS

Hassan et al., U.S. Appl. No. 13/656,267, filed Oct. 19, 2012.
Hassan, U.S. Appl. No. 13/723,130, filed Dec. 20, 2012.

(Continued)

*Primary Examiner* — Brian Healy
(74) *Attorney, Agent, or Firm* — Treyz Law Group; G. Victor Treyz; Kendall P. Woodruff

(57) ABSTRACT

Electronic devices may be provided with display structures such as glass and polymer layers in a liquid crystal display. The glass layers may serve as substrates for components such as a color filter layer and thin-film transistor layer. The polymer layers may include films such as a polarizer film and other optical films. During fabrication of a display, the polymer layers and glass layers may be laminated to one another. Portions of the polymer layers may extend past the edges of the glass layers. Laser cutting techniques may be used to trim away excess portions of the polymer layer that do not overlap underlying portions of the glass layers. Laser cutting may involve application of an adjustable infrared laser beam.

20 Claims, 14 Drawing Sheets

U.S. PATENT DOCUMENTS

| | | |
|---|---|---|
| 8,235,761 B2 | 8/2012 | Tannas, Jr. |
| 8,259,263 B2 | 9/2012 | Kimura et al. |
| 2005/0238852 A1 | 10/2005 | Nakayama et al. |
| 2006/0197904 A1 | 9/2006 | Kinoshita et al. |
| 2007/0188688 A1* | 8/2007 | Hwang et al. ............. 349/122 |
| 2007/0211331 A1 | 9/2007 | Danner et al. |
| 2009/0130341 A1 | 5/2009 | Asada |
| 2010/0147814 A1* | 6/2010 | Watanabe ............. 219/121.72 |
| 2010/0210055 A1* | 8/2010 | Yoon et al. ............. 438/30 |
| 2011/0109829 A1 | 5/2011 | Mathew et al. |
| 2012/0020001 A1 | 1/2012 | Mathew et al. |
| 2012/0200812 A1* | 8/2012 | Qi et al. ............. 349/106 |

OTHER PUBLICATIONS

Gupta et al., U.S. Appl. No. 61/745,117, filed Dec. 21, 2012.

* cited by examiner

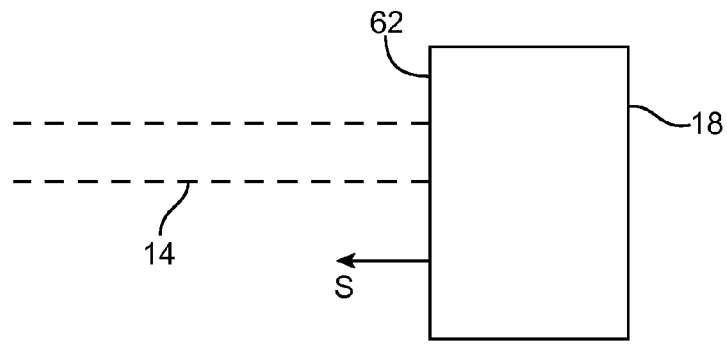
FIG. 8A  FIG. 8B
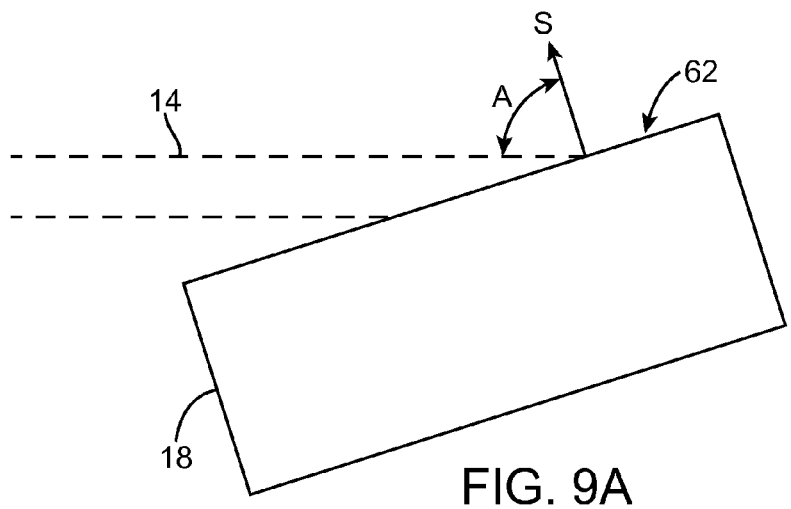
FIG. 9A
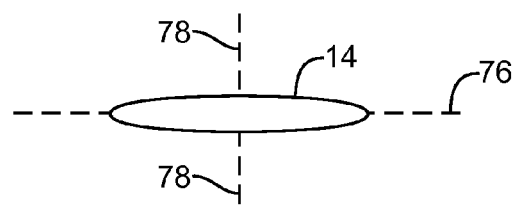
FIG. 9B

LASER PROCESSING OF DISPLAY COMPONENTS FOR ELECTRONIC DEVICES

BACKGROUND

This relates generally to manufacturing techniques for electronic devices, and, more particularly, to use of laser processing techniques in the construction of electronic device structures such as display structures Displays are widely used in electronic devices to display images. Displays such as liquid crystal displays display images by controlling liquid crystal material associated with an array of image pixels. A typical liquid crystal display has a color filter layer and a thin-film-transistor layer between which the liquid crystal material is interposed. Polarizer layers may be formed on the upper and lower surfaces of the color filter layer and thin-film-transistor layer. Additional optical films may also be present.

As part of the process of forming a liquid crystal display, it is necessary to cut sheets of polarizer film and other optical films to size. For example, when forming a display for a handheld device such as a cellular telephone, it is necessary to form a small rectangular piece of polarizer film for the cellular telephone display. After the desired piece of optical film has been cut from a larger sheet, it can be laminated to other structures to form a finished display.

Die cutting techniques are typically used to cut rectangular pieces of polarizer film and other optical films from larger sheets. Difficulties can arise, however, in maintaining desired manufacturing tolerances during die cutting and lamination processes during display fabrication.

It would therefore be desirable to be able to provide enhanced techniques for manufacturing displays for electronic devices.

SUMMARY

Displays for electronic devices may be formed by laminating display layers together. The display layers in a display may include glass layers such as glass substrate layers associated with a color filter array and a thin-film transistor layer or other structures. The display layers may also include layers of other materials. As an example, the display layers may include optical films such as compensating films, diffusers, polarizers, antireflection coatings, and other layers formed from materials such as polymers.

In fabricating a display, layers of the display may be attached to one another using adhesive. With one suitable arrangement, glass layers for the display may be cut to their final size. Slightly oversized polymer layers may be attached to the surface of the glass layers. The polymer layers may be sized so that portions of the polymer layers do not overlap the glass layers, but rather overhang the edges of the glass layers.

Laser cutting techniques may be used in trimming away these excess portions of the polymer layers. For example, an infrared laser beam may be applied along the edge of the glass layers to remove the overhanging parts of the polymer layers. The resulting structure will have polymer layers with edges that are in alignment with the edges of the glass layers.

The size and shape of the laser spot that is created on the display layers during laser cutting operations can be adjusted. For example, the spot can be elongated when cutting along straight edges for a display and can be formed into a more circular shape when cutting along curved portions of a display such as around display corners.

Further features of the invention, its nature and various advantages will be more apparent from the accompanying drawings and the following detailed description of the preferred embodiments.

BRIEF DESCRIPTION OF THE DRAWINGS

FIG. 8A is a diagram showing how a laser beam may be directed toward a workpiece parallel to a surface normal associated with the exposed surface of a workpiece in accordance with an embodiment of the present invention.

FIG. 8B is a diagram of an illustrative laser beam spot of the type that may be associated with the laser beam of FIG. 8A on the surface of the workpiece in accordance with an embodiment of the present invention.

FIG. 9A is a diagram showing how a laser beam may be directed toward a workpiece at a non-zero angle with respect to a surface normal associated with the exposed surface of a workpiece in accordance with an embodiment of the present invention.

FIG. 9B is a diagram of an illustrative laser beam spot of the type that may be associated with the laser beam of FIG. 9A on the surface of the workpiece in accordance with an embodiment of the present invention.

DETAILED DESCRIPTION

Displays are widely used in electronic devices. For example, displays may be used in computer monitors, laptop computers, media players, cellular telephones and other handheld devices, tablet computers, televisions, and other equipment. Displays may be based on plasma technology, organic light-emitting-diode technology, liquid crystal structures, etc.

Displays generally include layers of materials. For example, a liquid crystal display may include a color filter array layer that includes colored filter elements, a thin-film transistor layer that includes thin-film transistors for controlling the application of electric fields to liquid crystal image pixels. A cover layer may be used to cover the display. The cover layer and other display layers such as the colored filter array layer and thin-film-transistor layer are typically formed from glass but may, if desired, by formed from other substrate materials such as polymers.

Numerous additional display layers are generally associated with a display. For example, a typical liquid crystal display may include layers associated with polarizers, anti-reflection coatings, substrates for touch sensor arrays, birefringent (compensating) films, light guide plates, diffusers, etc. These layers, which are sometimes referred to as optical films are often formed from polymers.

In conventional display fabrication arrangements, glass layers may be cut using scribe-and-break techniques. Polymer layers may conventionally be cut using die stamping techniques. Layers that have been cut in this way may be laminated using lamination equipment.

To enhance throughput and alignment accuracy relative to conventional display fabrication methods, laser cutting techniques may be used to cut electronic device structures such as the layers associated with an electronic device display. Polymers can be readily cut using lasers such as infrared lasers, so the use of laser cutting to trim polymer layers with respect to other display layers is sometimes described herein as an example. If desired, other display layers such as display layers formed from glass, ceramic, carbon-fiber composites and other materials may be patterned using laser processing techniques. The cutting of display layers formed from material such as polymers is merely an example.

Figure 1:
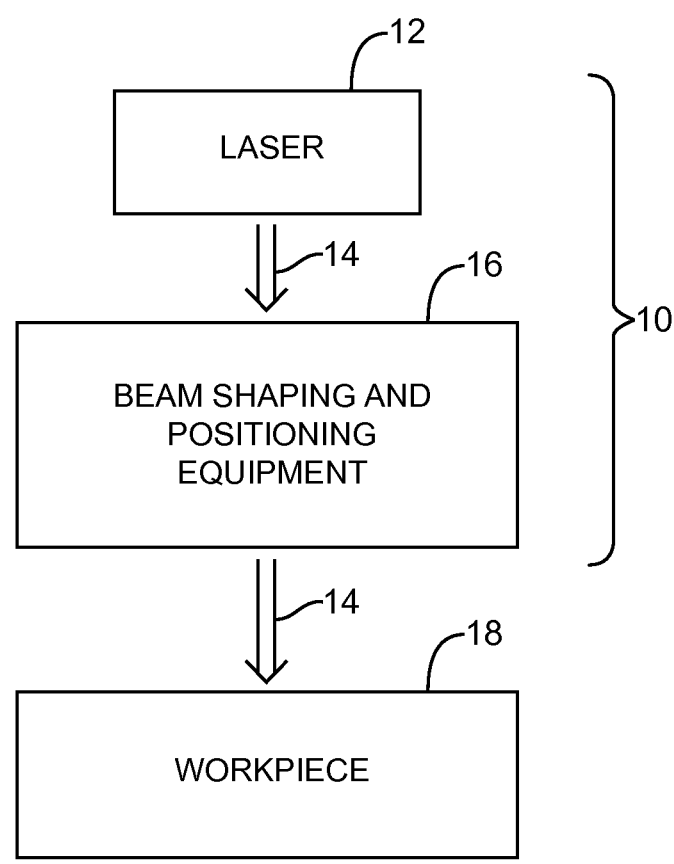
FIG. 1 is a diagram of a system of the type that may be used in fabricating display structures for an electronic device using laser processing techniques in accordance with an embodiment of the present invention.

A schematic diagram of an illustrative laser cutting system is shown in FIG. 1. As shown in FIG. 1, laser cutting equipment 10 may include a laser such as laser 12 and beam shaping and positioning equipment 16. Equipment 10 may shape and position laser beam 14 on workpiece 18. Workpiece 18 may include display structures such one or more layers of material in a display or other suitable electronic device structures (e.g., one or more layers of polymer, one or more layers of glass, one or more layers of ceramic, one or more fiber-based composite layers, combinations of such layers, etc.).

Laser 12 may be, for example, a continuous wave (CW) or pulsed laser that produces light at wavelengths from about 150 nm to about 20 microns (e.g., light at ultraviolet, visible, or infrared wavelengths), and, more preferably a laser that produces infrared light at a wavelength in the range of 1 to 20 microns, 1 to 12 microns, or 9 to 12 microns. In the infrared spectrum, high-power laser sources are widely available and most polymers are at least somewhat opaque and able to readily absorb incoming laser light. An example of a laser type that may be used for laser 12 is a carbon dioxide ($CO_2$) laser that produces light at one or more wavelengths in the range of about 9.2 to 11.4 microns). Other types of lasers may be used and other wavelengths of laser light may be generated. For example, laser 12 may be a diode laser, a solid state laser, a gas laser other than a CO2 laser, or any other suitable type of laser.

Laser 12 may produce a pulsed or CW laser beam such as beam 14. The shape of beam 14 and the position of beam 14 relative to workpiece 18 may be controlled using beam shaping and positioning equipment 16. Equipment 16 may include optical components such as lenses, metallized mirrors, mirrors formed from prisms, mirrors formed from dielectric stacks, diffusers, beam conditioners, filters, deformable mirrors, adjustable shutters, and other optical components. Equipment 16 may also include positioners such as motors, solenoids, and other components that can control the position of the optical components of beam shaping and positioning equipment 16 relative to workpiece 18 (e.g., by rastering the beam across the surface of workpiece, by laterally translating the beam and/or workpiece 18 relative to each other, by adjusting the distance between optical components in equipment 16, be deforming deformable optical structures, etc.).

In a typical scenario, laser 12 may produce about 10 to 100 W of output power or other suitable amounts such as less than 50 W of power, more than 20 W of power, etc. Beam 14 may be focused to a spot on workpiece 18 that has a spot size (e.g., a $1/e^2$ diameter) of about 100 to 500 microns in diameter. Under laser illumination conditions such as these, optical films such as polarizer layers and other polymer layers in workpiece 18 will be cut (e.g., by thermal disassociation of the bonds in the polymer material or other decomposition mechanisms such as ablation).

Figure 2A:
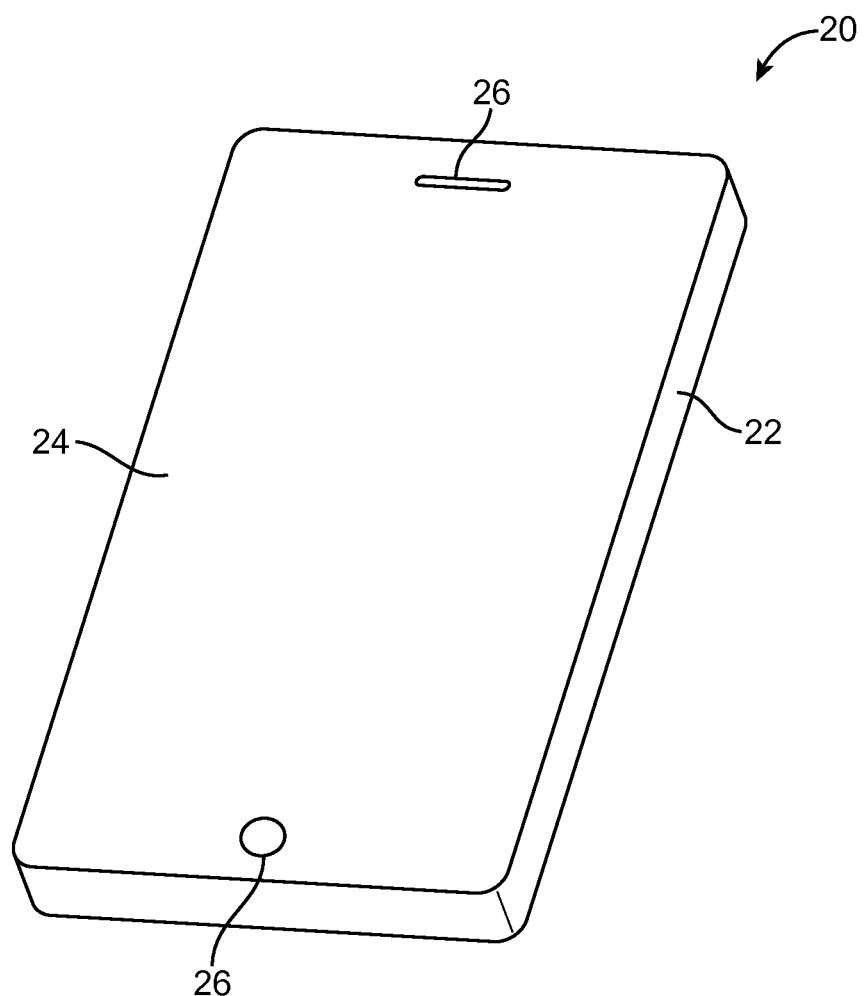
FIG. 2A is a perspective view of an illustrative electronic device such as a handheld electronic device that may be provided with a display that has been fabricated using laser processing techniques in accordance with an embodiment of the present invention.

A perspective view of an illustrative electronic device such as a handheld electronic device that may be provided with a display containing laser-cut materials such as layers processed using laser processing equipment 10 of FIG. 1 is shown in FIG. 2A. As shown in FIG. 2A, electronic device 20 may have a housing such as housing 22. Housing 22 may be formed from materials such as plastic, glass, ceramic, metal, fiber composites, and combinations of these materials. Housing 22 may have one or more sections. In the arrangement of FIG. 2A, device 20 has a front face and a rear face. Display 24, which may be formed from display structures in workpiece 18 of FIG. 1, may be mounted on the front face of housing 22. Openings 26 may be provided in display 24. For example, openings 26 may be used to form speaker ports, button openings, and other openings in a cover glass layer for display 24 or in other display layers.

Figure 2B:
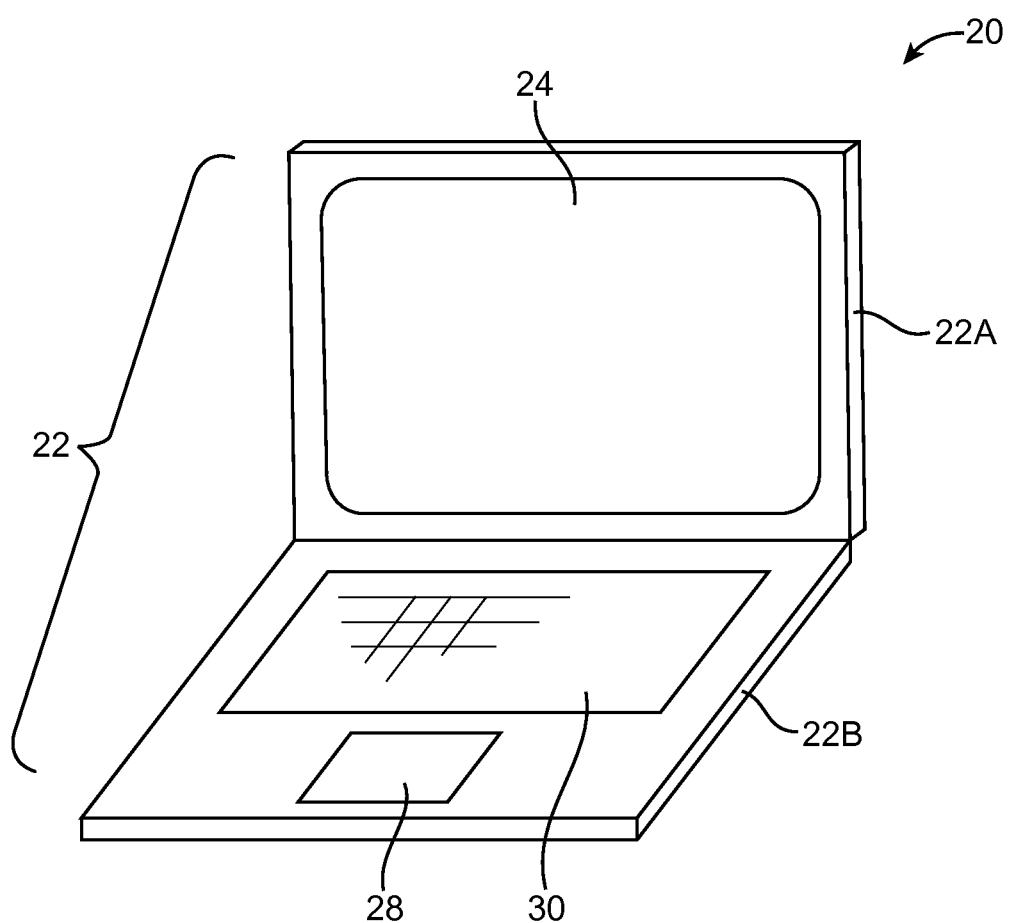
FIG. 2B is a perspective view of an illustrative electronic device such as a portable computer that may be provided with a display that has been fabricated using laser processing techniques in accordance with an embodiment of the present invention.

A perspective view of another illustrative electronic device of the type that may be provided with a display that has been fabricated using laser processing equipment such as laser processing equipment 10 of FIG. 1 is shown in FIG. 2B. In the example of FIG. 2B, housing 22 has upper portion 22A and lower portion 22B. Portions 22A and 22B may be attached using a hinge. Upper portion 22A may be used to house display 24. Processing circuitry and input-output components such as track pad 28 and keyboard 30 may be provided in lower portion 22B. Device 20 of FIG. 2B may be, for example, a portable computer.

In other illustrative electronic devices (e.g., tablet computers, music players, etc.), displays such as display 24 and other electronic device components may be mounted in housings 22 with other configurations. The display mounting arrangements of FIGS. 2A and 2B are merely illustrative.

Figure 3:
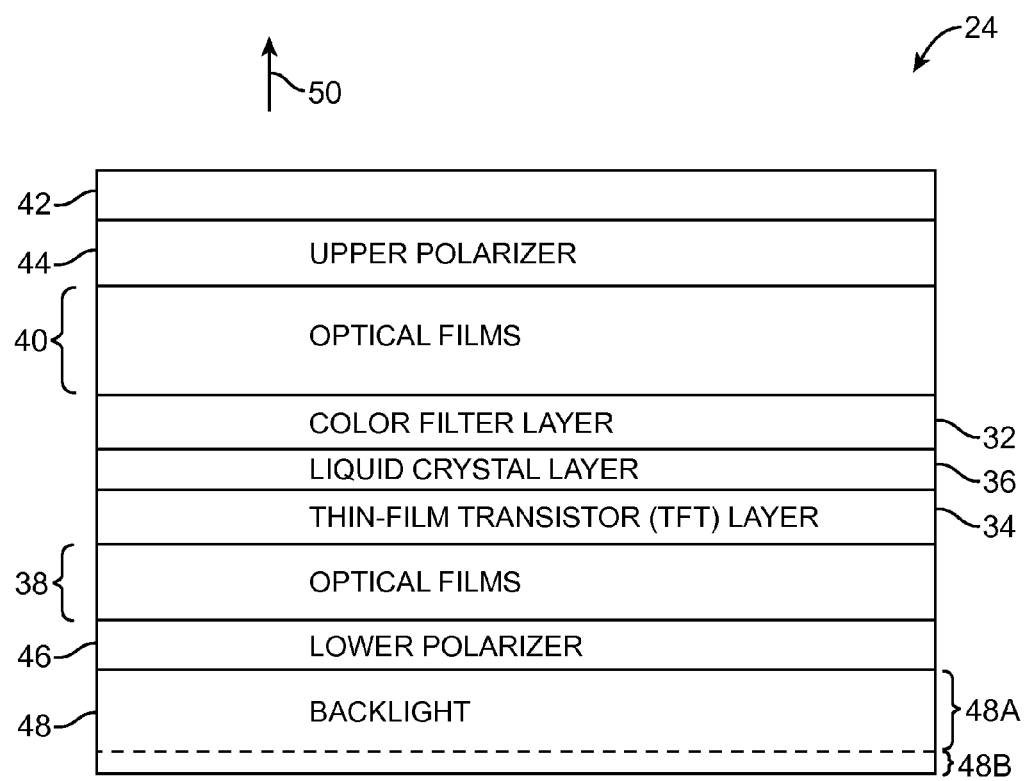
FIG. 3 is a cross-sectional side view of an illustrative display containing layers of material of the type that may be processed using a laser cutting system in accordance with an embodiment of the present invention.

A cross-sectional side view of an illustrative display of the type that may be incorporated into an electronic device is shown in FIG. 3. The illustrative display of FIG. 3 is a liquid crystal display (as an example). Other types of displays may be provided for electronic devices if desired.

As shown in FIG. 3, display 24 may include color filter layer 32 (sometimes referred to as a color filter array layer) and thin-film-transistor layer 34. Color filter layer 32 may include an array of colored filter elements. In a typical arrangement, the pixels of layer 32 each include three types of colored pixels (e.g., red, green, and blue subpixels). Liquid crystal layer 36 includes liquid crystal material and is generally interposed between color filter layer 32 and thin-film-transistor layer 34. Thin-film-transistor layer 34 may include electrical components such as thin film transistors, capacitors, and electrodes for controlling the electric fields that are applied to liquid crystal layer 36.

Optical film layers 38 and 40 and display layers 42 may be formed above and below color filter layer 12, liquid crystal layer 16, and thin-film-transistor layer 14. Optical films 18 and 20 may include structures such as quarter-wave plates, half-wave plates, diffusing films, optical adhesives, and birefringent compensating layers. Display layers 42 may include films of this type and/or other display structures such as a cover glass layer or polymer cover layer, an antireflection coating layer, coatings for resisting fingerprints and scratching, a touch sensor array (e.g., a touch sensor array of transparent capacitive electrodes such as indium tin oxide electrodes patterned on a clear substrate such as a glass or polymer substrate), etc.

Display 24 may have upper and lower polarizer layers 44 and 46. Backlight 48 may provide backside illumination for display 24. Backlight 48 may include a light source such as a strip of light-emitting diodes. Backlight 48 may also include light-guide plate 48A and back reflector 48B. Back reflector 48B may be located on the lower surface of the light-guide plate to prevent light leakage and may be formed from a polymer such as white polyester or other reflective materials. Light-guide plate 48A may be formed from a clear polymer. Light from the light source may be injected into an edge of the light-guide plate and may scatter upwards in direction 50 through display 24. Layers of adhesive may be interposed between the layers of display 24 during assembly.

The layers of material in display 24 may be formed from any suitable materials. Typical display layers above those in backlight 48 are transparent to allow light to propagate in direction 50. Suitable display layer materials include polymers, glass, ceramic, fiber-based composites, etc. In a typical arrangement, the cover layer in layer 42 may be formed from a glass plate, the substrates for color filter layer 32 and thin-film-transistor layer 34 may be formed from glass panels, and glass or polymer may be used for forming an optional planar touch sensor array substrate for a touch sensor in layers 42. The other layers of material in display 24 (e.g., the coating layers and other display layers in layers 42, upper and lower polarizers 44 and 46, optical films 40 and 46, and the layers in backlight 48) are typically formed from polymers. This is, however, merely an example. In some displays, some of the layers that are often formed form polymers may be formed form glass, ceramic, or other materials and some of the layers that are often formed from glass layers may be formed from polymer, ceramic, or other materials. Polymer layers tend to be cut at lower laser power densities than non-polymer layers, so the use of laser processing equipment 10 of FIG. 1 to cut through polymer layers in the structures of display 24 is generally described herein as an example. As described in connection with FIG. 1, laser processing equipment 10 may be used in processing glass display layers or other non-polymer electronic device structures if desired.

Figure 4A:
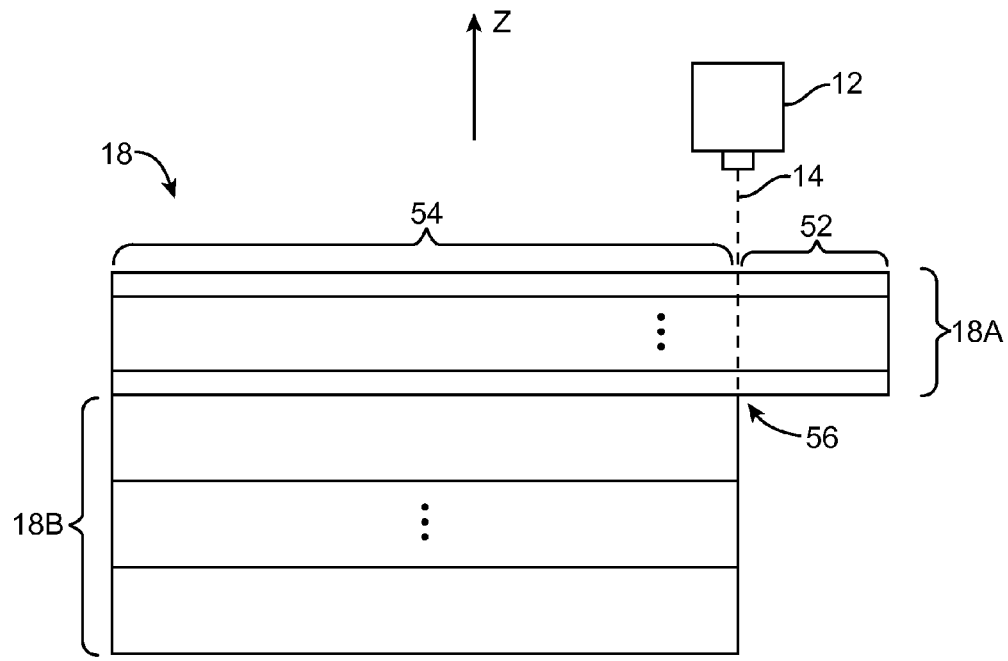
FIG. 4A is a cross-sectional side view of illustrative display structures showing how display layers such as polymer optical films may be trimmed using laser cutting techniques in accordance with an embodiment of the present invention.
Figure 4B:
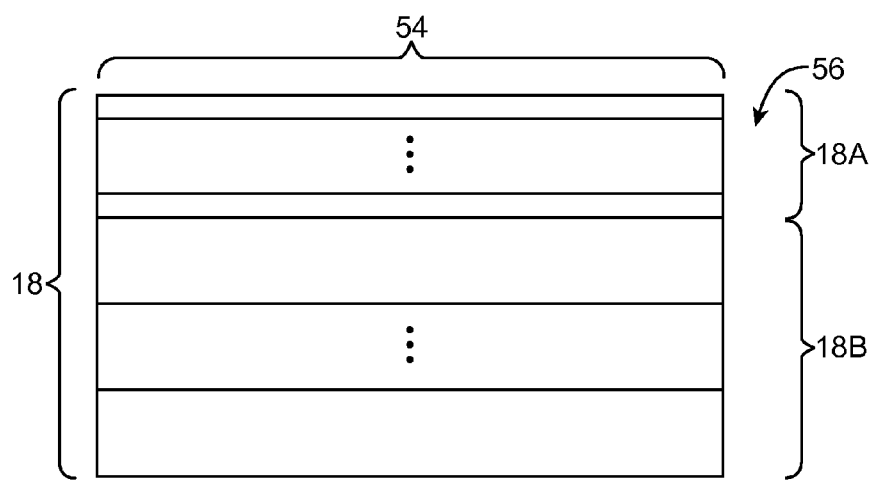
FIG. 4B is a cross-sectional side view of the illustrative display structures of FIG. 4A following laser trimming to remove excess portions of the optical films in accordance with an embodiment of the present invention.

The use of laser processing equipment 10 to cut polymers in structures such as display 24 is illustrated in the example of FIGS. 4A and 4B. In the example of FIGS. 4A and 4B and other illustrative examples described herein, the structures that make up some or all of display 24 are sometimes referred to as forming a workpiece (i.e., workpiece 18 of FIG. 1), because laser processing equipment 10 is being used to process these structures to form a display or other desired finished electronic device structures.

FIG. 4A is a cross-sectional side view of a workpiece (workpiece 18) having one or more layers 18A and one or more layers 18B. Layers 18A may be polymer display layers such as optical films, polymer coatings, polymer touch panel substrates, polarizers, etc. Layers 18B may be glass or ceramic display layers such as a color filter array layer, a thin-film-transistor layer, etc. Layers 18A may be located on the upper surface of workpiece 18 on top of layers 18B or may be interspersed among layers 18B.

In the scenario illustrated in FIG. 4A, layers 18A have been precut to a size that is somewhat larger than layers 18B. Layers 18B may, for example, be cut using a scribe-and-break process that creates a desired rectangular display footprint and layers 18A may be die cut to a size that is slightly larger than the nominal rectangular shape for layers 18B. Other techniques for cutting layers 18A and 18B may be used, if desired.

Over-sizing layers 18A with respect to layers 18B creates an overhanging portion such as portion 52 that does not overlap the "footprint" of layers 18B (i.e., a portion that does not overlap the area of layers 18B when viewed along vertical dimension Z). Central portion 54 of layers 18A may overlap layers 18B. Although only one overlapping edge portion 52 of layers 18A is shown in FIG. 4A, there may be, for example, four overlapping edge portions 52, each of which is associated with a respective one of four edges 56 of a rectangular set of layers 18B (e.g., the four peripheral edges of a rectangular display).

By applying laser beam 14 to layers 18A in alignment with edge 56 of layers 18B, non-overlapping edge portion 52 of layers 18A may be trimmed from main overlapping portion 54 of layers 18A. After trimming excess portions of layers 18A from workpiece 18 in this way, workpiece 18 may appear as shown in FIG. 4B. As shown in FIG. 4B, portion 52 of layers 18A is no longer present following laser trimming, so that edge 56 of layers 18A is aligned with edge 56 of layers 18B. The accuracy of this type of laser trimming may surpass the accuracy associated with typical die cutting and lamination processes. For example, using a spot size of less than 0.05 mm and positioning techniques that are able to locate beam 14 relative to edge 56 of layers 18B within +/−0.05 mm, the location of trimmed edge 56 of layers 18A may be aligned to the edge of layers 18B within +/−0.1 mm, whereas conventional die cut processes typically exhibit size tolerances of 0.2 mm and conventional lamination processes typically exhibit edge location tolerances of about 0.2 mm.

Figure 5:
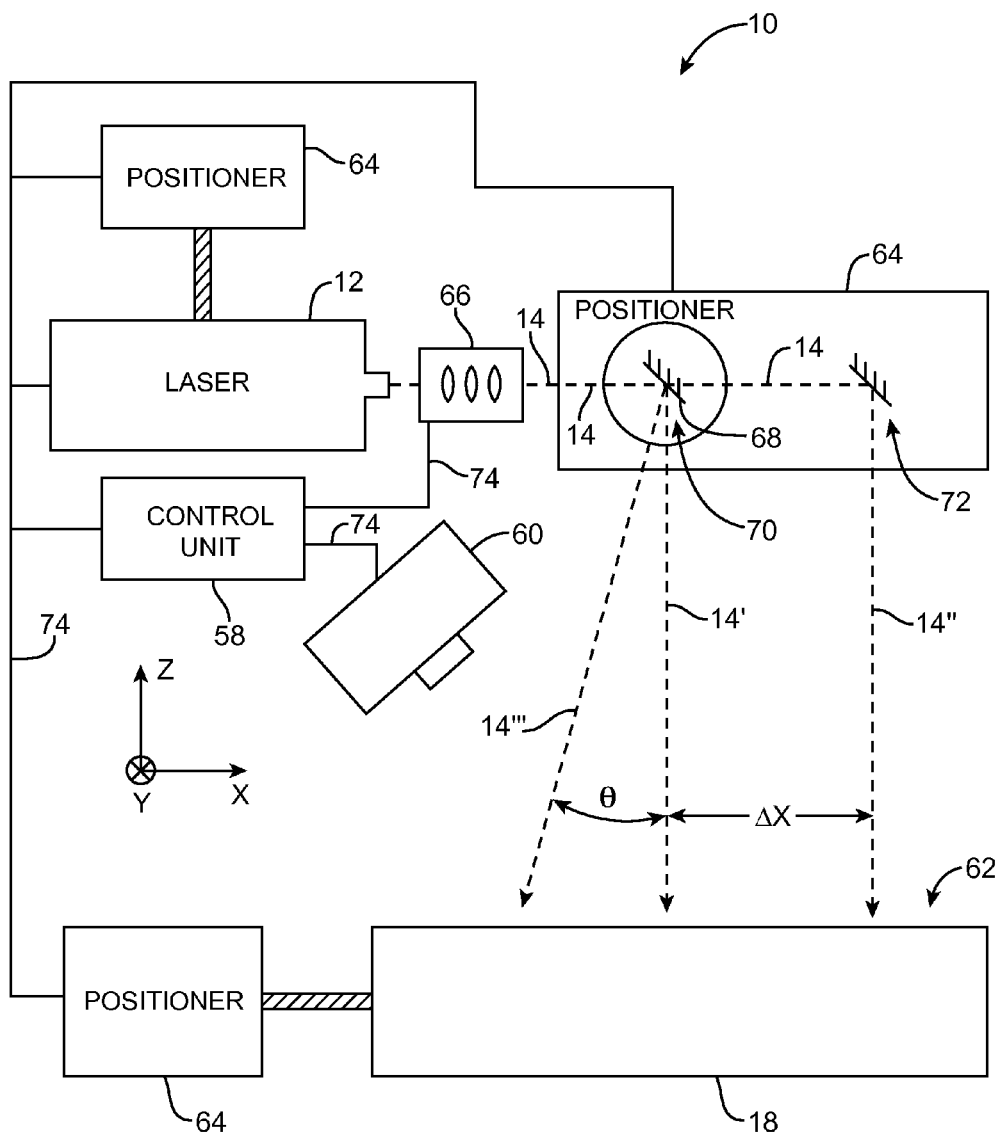
FIG. 5 is a diagram of an illustrative laser processing system showing how laser cutting equipment may produce a controlled laser beam for use in cutting layers of material during fabrication of a display for an electronic device in accordance with an embodiment of the present invention.

FIG. 5 is a diagram of illustrative laser processing equipment 10 of the type that may be used in cutting through display structures such as polymer display films or in cutting other suitable electronic device structures. As shown in FIG. 5, equipment 10 may include a control unit such as control unit 58 that is interconnected with other electronic components in equipment 10 using one or more communications paths 74. Control unit 58 may use a camera such as camera 60 or other sensors to monitor the position of laser beam 14 on surface 62 of workpiece 18. For example, control unit 58 may use camera 60 to detect edges and alignment marks on workpiece 18 to facilitate accurate positioning of the laser spot on workpiece 18. Control unit 58 may be based on computing equipment such as one or more processors, memory chips, networked computers, stand-alone computers, and other computing equipment. A user may manually control the operation of components in system 10 using buttons, knobs, and other user input interface components that are associated with the components of system 10 and/or by using a touch screen, on-screen options, keyboard, buttons, mouse, or other user input interface components associated with control unit 58. Control unit 58 may also automatically control equipment 10 (e.g., based on sensor input such as input from camera 60).

Control unit 58 may issue control signals that control the operation of one or more positioners 64. Positioners 64 may be associated with the components of laser processing system 10 such as laser 12, beam shaping equipment 66, optical components 68 (e.g., mirrors, lenses, etc.), and workpiece 18. Positioners 64 may include motors, solenoids, and other suitable equipment for making position adjustments. Position adjustments may be made in linear dimensions X, Y, and Z and in any of the rotational (angular) positions about these axes.

Laser beam 14 may be shaped using optical components 66 and 68. Components 66 and 68 may include lenses, filters, mirrors, and other optical components for shaping and positioning beam 14 relative to workpiece 18. For example, components 66 may include lenses and other components for homogenizing or otherwise conditioning beam 14. Components 66 may be interposed within beam 14 at one or more locations. The illustrative configuration of FIG. 5 in which components 66 lie between laser 12 and optical components 68 is merely illustrative.

Optical components 68 such as mirrors and other components may be positioned using positioners 64. By laterally translating mirrors or other optical components, the lateral position of beam 14 may be controlled. For example, control unit 58 may direct a positioner on which a mirror has been mounted from position 70 to position 72, thereby translating reflected beam 14 so that it passes along path 14" rather than path 14'. Rotational control of components 68 (e.g., mirrors) may also be used in adjusting the relative position of beam 14 an workpiece 18. For example, by rotating a mirror or other component 68, beam 14 may be deflected so that it passes along path 14'" rather than path 14'. Combinations of beam rastering (e.g., positioner adjustment to deflect beam 14 at a desired angle θ) and translation (e.g., positioner adjustment to change the lateral position of beam 14 by a desired amount ΔX) may be used in controlling beam placement if desired. Control unit 58 may also control the output power from laser 12 by issuing control commands over communications path 74 and may control the state of deformable mirrors and other optical components 66 and 68 (e.g., to adjust beam intensity profiles, beam shapes, etc.).

Figure 6:
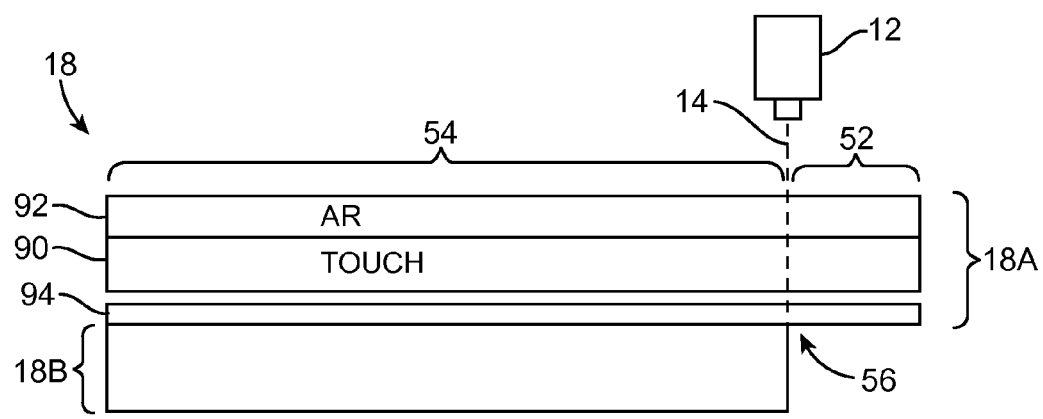
FIG. 6 is a cross-sectional side view of display structures including layers such as an antireflection coating layer and a touch sensor layer that are being trimmed to align the edges of these layers with other display layers in a display in accordance with an embodiment of the present invention.

FIG. 6 shows how laser 12 may be used to trim portions of a workpiece that includes a touch sensor layer (e.g., touch sensor layer 90, which may have a polymer substrate and conductive indium-tin-oxide capacitor electrodes for forming a capacitive touch sensor array). During trimming, laser beam 14 may be used to remove portion 52 of layers 18A. Layers 18A may be (for example) polymer layers including layer 92 (e.g., an antireflection layer or other coating layer), touch sensor layer 90, and layer 94 (e.g., a polarizer layer, other optical films, etc.). Laser beam 14 may have sufficient intensity to cut through all of layers 18A simultaneously. In scenarios in which layers 18B are formed form a durable substrate material such as glass or ceramic, stray light from beam 14 will not generally affect layers 18B (i.e., layers 18B will not be cut) during the trimming process that removes excess portions of layers 18A.

Figure 7A:
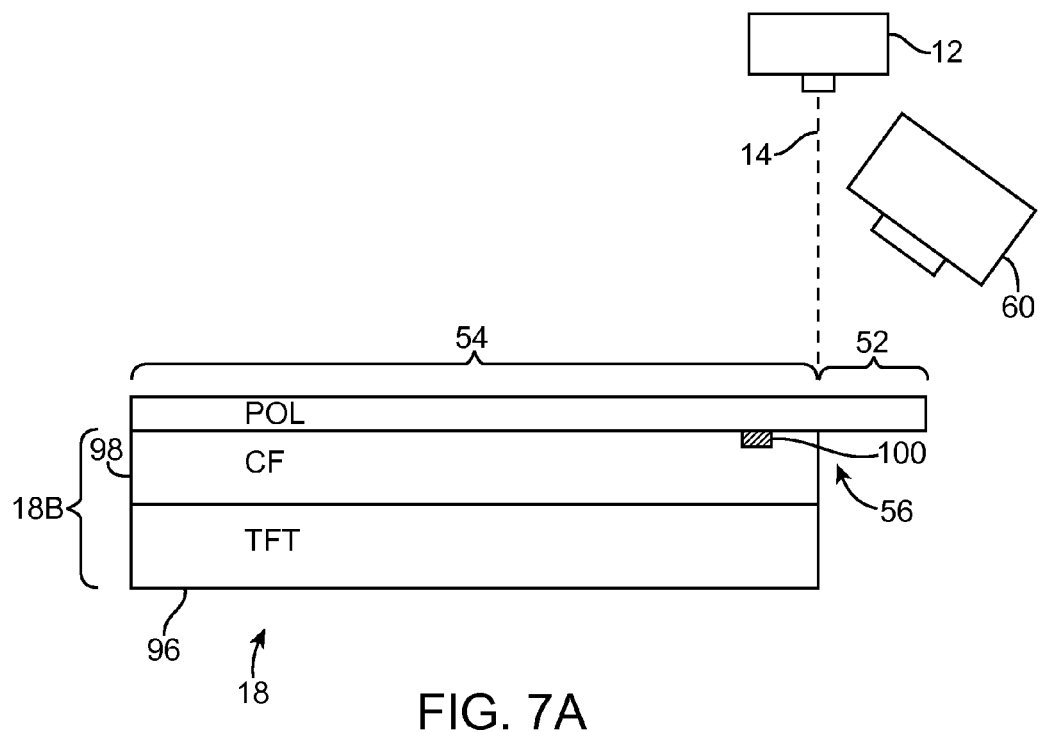
FIG. 7A is a cross-sectional side view of illustrative display structures that include display layers such as a color filter array layer and a thin-film-transistor layer and an associated polymer film such as a layer of polarizing material that is being cut using laser cutting equipment in accordance with an embodiment of the present invention.

FIG. 7a shows how laser beam 14 may be used to remove polymer layers 18A (e.g., a polarizer layer and/or other optical films) from underlying glass or ceramic layers 18B (e.g., color filter array layer 98 and thin-film transistor layer 96). Camera 60 may be used to capture images of layers 18A and 18B. For example, camera 60 may be used to view the position of edge 56 of layers 18B. Control unit 58 (FIG. 5) may control beam shaping and positioning equipment 16 so as to position beam 14 relative to workpiece 18 with beam 14 in alignment with edge 56. Control unit 58 may determine how to adjust beam shaping and positioning equipment 16 in response to manual operator input and/or automatic image recognition software running an edge detection routine or other control algorithms on control unit 58.

Figure 7B:
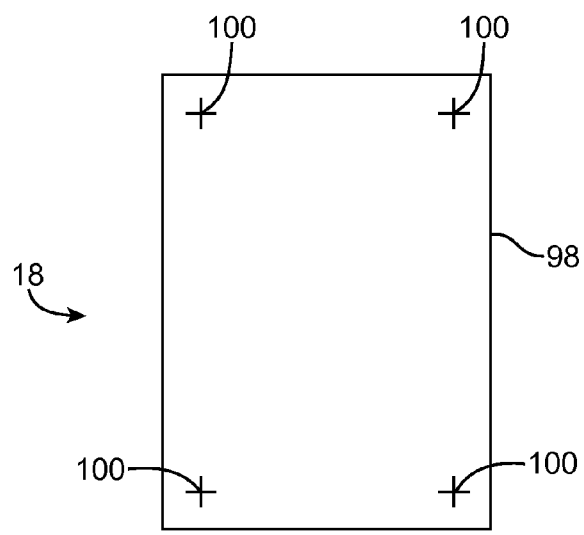
FIG. 7B is top view of the illustrative display structures of FIG. 7A showing where alignment marks may be located on the display structures in accordance with an embodiment of the present invention.

To assist a user of equipment 10 and/or the automatic image recognition software running on control unit 58 in accurately determining the location of workpiece 18 (e.g., features such as edge 56 of workpiece 18), one or more of the layers of workpiece 18 may be provided with visual markers such as alignment marks 100 on color filter layer 98 in the FIG. 7A example. Alignment marks 100 may assist equipment 10 in locating edges such as edge 56 and in accurately positioning beam 14 in alignment with edges such as edge 56 during laser cutting operations. Alignment marks 100 may have any suitable shape (crosses, dots, lines, squares, etc.) and may be formed from metal or other suitable materials. FIG. 7B is a top view of color filter layer 98 of FIG. 7A showing how alignment marks 100 may be placed at the four corners of workpiece 18 (as an example).

It may be desirable to adjust the shape of beam 14 during laser processing operations. For example, it may be desirable to elongate the cross-sectional shape of beam 14 in some situations and to ensure that the cross-sectional shape of beam 14 (i.e., the shape of the laser spot formed when beam 14 strikes the workpiece) is circular in other situations. Laser spot shapes may be modified by controlling the settings and positions of optical components in the path of beam 14 and/or by controlling the orientation of workpiece 18 relative to beam 14. Examples of components that may be used in shaping and positioning beam 14 (e.g., components in optical components 66 and/or components 68 of FIG. 5 or other components in the path of beam 14) include lenses, metallized mirrors, mirrors formed from prisms, mirrors formed from dielectric stacks, diffusers, beam conditioners, filters, deformable mirrors, adjustable shutters, and other optical components.

An example of beam shaping by equipment 10 is shown in FIGS. 8A, 8B, 9A, and 9B. In this example, laser spot shape is altered by adjusting the incident angle of beam 14 on surface 62 of workpiece 18. If desired, other techniques may be used in shaping beam 14 (e.g., deforming beam 14 using adaptive optics such as deformable mirrors, etc.). The example of FIGS. 8A, 8B, 9A, and 9B is merely illustrative.

In the scenario illustrated in FIG. 8A, laser beam 14 is being directed onto surface 62 of workpiece 18 with an orientation that is parallel to surface normal S (i.e., laser beam 14 is parallel to surface normal S and is perpendicular to the plane of surface 62). Beam 14 (in this example) has a circular cross-sectional profile before striking surface 62. As a result, beam 14 makes a circular spot when striking surface 62, as shown in FIG. 8B.

Using beam shaping and positioning equipment 16 of FIG. 1 (e.g., using positioners 64, laser 12, and optical components such as components 66 and 68 of FIG. 5), control unit 58 can adjust the orientation of laser beam 14 relative to workpiece 18 so that laser beam 14 is directed onto surface 62 of workpiece 18 with an orientation that is not parallel to surface normal S. In this situation, laser beam 14 is at a non-zero angle A with respect to surface normal S and is not perpendicular to the plane of surface 62, as shown in FIG. 9A. Beam 14 (in this example) has a circular cross-sectional profile before striking surface 62 of workpiece 18 in FIG. 9A, but the non-zero angle of incidence A of laser beam 14 in the scenario of FIG. 9A causes beam 14 so spread out when striking surface 62. As a result, beam 14 makes an elongated spot when striking surface 62, as shown by the elliptical spot for beam 14 in FIG. 9B.

In elongated spot shapes such as the elongated spot of FIG. 9B, the lateral dimension of the spot is larger parallel to longitudinal axis 76 than along transverse axis 78. For example, the size of the spot along axis 78 may be about 100 to 500 microns and the size of the spot along axis 76 may be about 100 microns to 1000 microns, in the range of 100 microns to 1 mm, in the range of 100 microns to 2 mm, in the range of 100 microns to 4 mm, etc. By controlling the power of laser 12, the power density of the elongated spot shape on surface 62 of FIG. 9B may be decreased, maintained at the same level, or increased relative to the circular spot shape of FIG. 8B.

Figure 10:
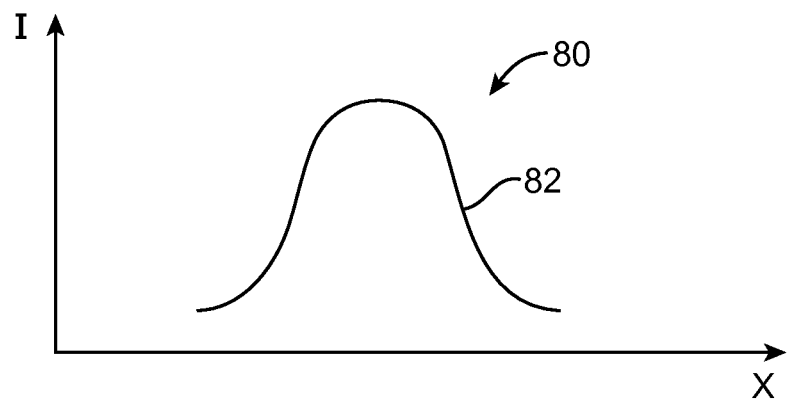
FIG. 10 is a graph in which laser beam intensity has been plotted as a function of position for a laser beam with a round cross section of the type that may be used in cutting layers of material for a display in accordance with an embodiment of the present invention.
Figure 11:
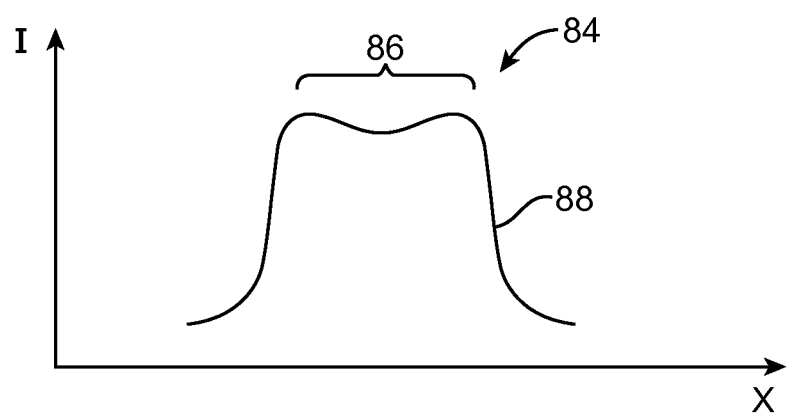
FIG. 11 is a graph in which laser beam intensity has been plotted as a function of position for a laser beam with an elongated cross section of the type that may be used in cutting layers of material for a display in accordance with an embodiment of the present invention.

If desired, beam (spot) shaping and positioning equipment 16 (FIG. 1) may be used in controlling the intensity profile of beam 14. Illustrative intensity profiles for beam 14 in two different operating scenarios are shown in FIGS. 10 and 11. In FIGS. 10 and 11, beam intensity is plotted as a function of lateral distance X transverse to the propagation axis of laser beam 14 (i.e., across the width of the spot).

A typical Gaussian profile of the type that may be associated with beam 14 and the associated laser spot on workpiece 18 is shown in FIG. 10. As shown by curve 80 of FIG. 10, a Gaussian intensity distribution is characterized by relatively gradual beam edges (i.e., intensity tapers off somewhat gradually as a function of increasing lateral distance X from the center of the beam).

Using beam shaping and positioning equipment 16, a beam profile of the type shown in FIG. 11 may be produced for laser beam 14. As shown by curve 84 of FIG. 11, a laser beam that has been shaped to form the profile of FIG. 10 may have a portion such as central portion 86 that does not monotonically increase in power and may also be characterized by an intensity falloff at the edges of the laser beam that is more abrupt that of the Gaussian beam of FIG. 10. This enhanced sharpness at the boarder of the laser spot may help create sharper, more distinct cuts when cutting polymer display layers in workpiece 18. The non-Gaussian laser intensity profile of FIG. 11 is merely illustrative. Other non-Gaussian laser intensity profiles may be used for laser beam 14 during laser cutting of display structures if desired.

Figure 12:
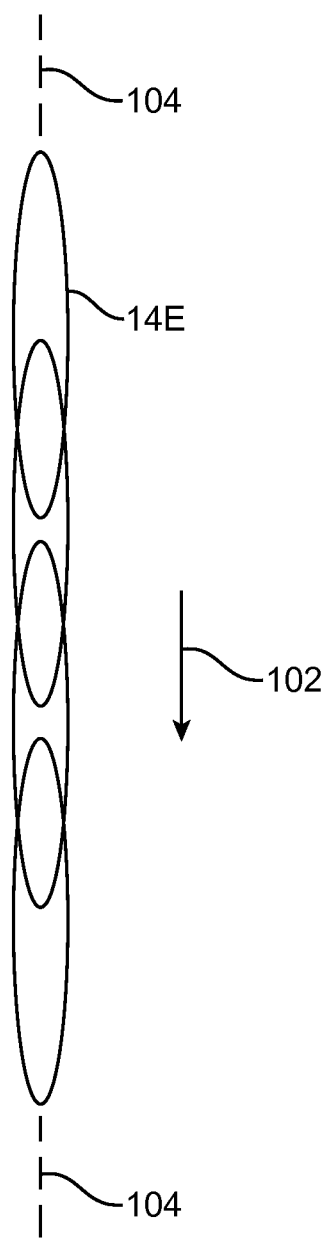
FIG. 12 is a diagram showing how a laser cut may be made by translating a laser beam with an elongated cross section along a direction parallel to the longitudinal axis of the beam cross section in accordance with an embodiment of the present invention.

FIG. 12 shows how a laser beam that has been used to form an elongated laser spot 14E on the surface of workpiece 18 may be used in forming a straight cut through workpiece 18. Elongated laser spot 14E may, as an example, be produced by adjusting the angle of incidence of beam 14 or using adjustable optics in beam shaping and positioning equipment 16 as described in connection with FIGS. 9A and 9B. In the illustrative scenario of FIG. 12, the laser beam is being moved in direction 102, parallel to axis 104 of the straight cut being formed in the workpiece.

Figure 13A:
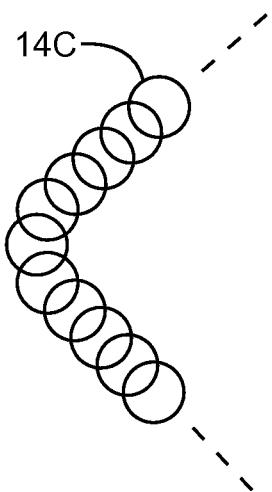
FIG. 13A is a diagram showing how a laser beam with a circular cross-sectional profile may be used in cutting optical films into shapes with curved edges in accordance with an embodiment of the present invention.
Figure 13B:
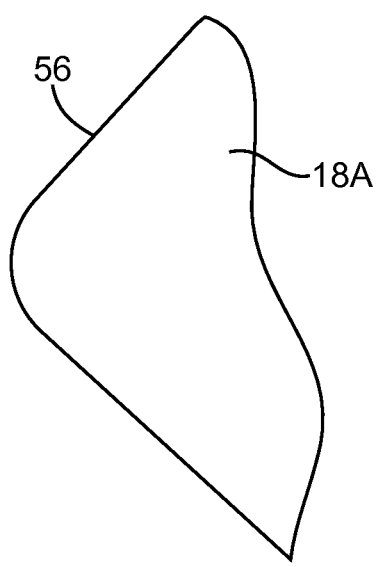
FIG. 13B is a top view of a portion of a laser-cut structure such as an display layer that has been cut using a laser with a circular cross section in accordance with an embodiment of the present invention.

When forming a curved cut (e.g., when trimming excess in display layers 18A that overhangs a curved corner portion of display layers 18B), it may be desirable to use a circular laser spot of the type shown in FIG. 8B. This type of arrangement is illustrated in the example of FIG. 13A in which circular laser spot 14C is being moved along a curved path by beam shaping and positioning equipment 16. FIG. 13B shows how this may result in layers 18A with a curved cut (e.g., a curved corner along edge 56). The curved cut of FIG. 13B may help trim excess from layers 18A so that layers 18A and 18B are accurately aligned along a curved edge 56 in underlying layers 18B.

Figure 14:
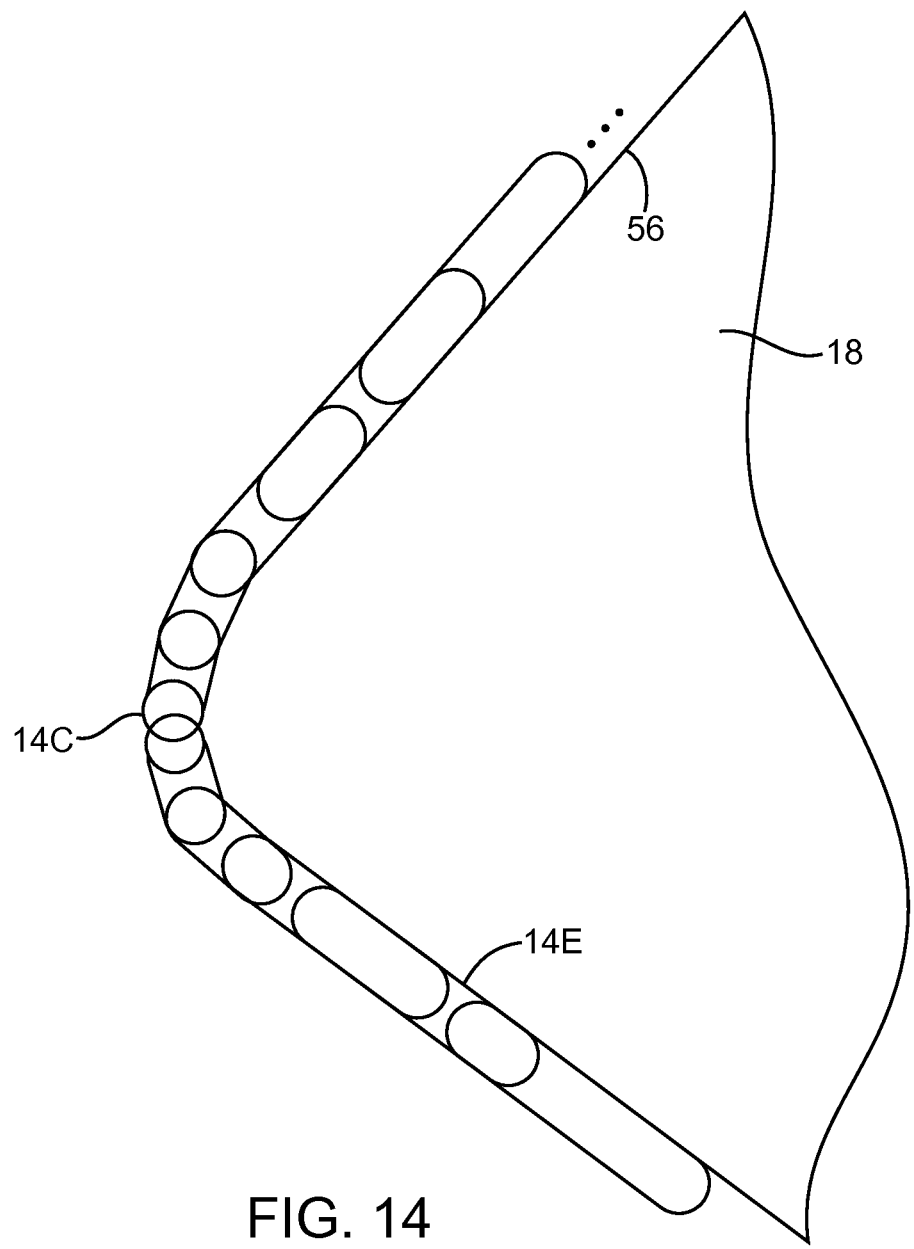
FIG. 14 is a diagram showing how a laser beam with a variable-shape cross-sectional profile may be used in cutting display layers into shapes with curved edges in accordance with an embodiment of the present invention.

If desired, beam shaping and positioning equipment 16 may be used to adjust the shape of the laser spot produced by laser beam 14 in real time during trimming operations. As shown, for example, in FIG. 14, in some portions of a cut such as along curved portions of edge 56, the laser spot may be circular or nearly circular (see, e.g., circular spot shape 14C) and in other portions of the cut (e.g., along straight portions of edge 56), the laser spot may be adjusted by equipment 16 to have an elongated shape such as elongated spot shape 14E. Real time adjustments may also be made to the intensity profile of laser beam 14 by equipment 16 (e.g., to use a gradual intensity profile such as the Gaussian profile of FIG. 10 in some situations and to use a less gradual intensity profile such as the profile of FIG. 11 in other situations). Intensity profile adjustments and other beam adjustments (e.g., spot shape adjustments) may be made to accommodate differences in cutting speeds, differences in the material being cut, differences in edge position, etc.

Figure 15:
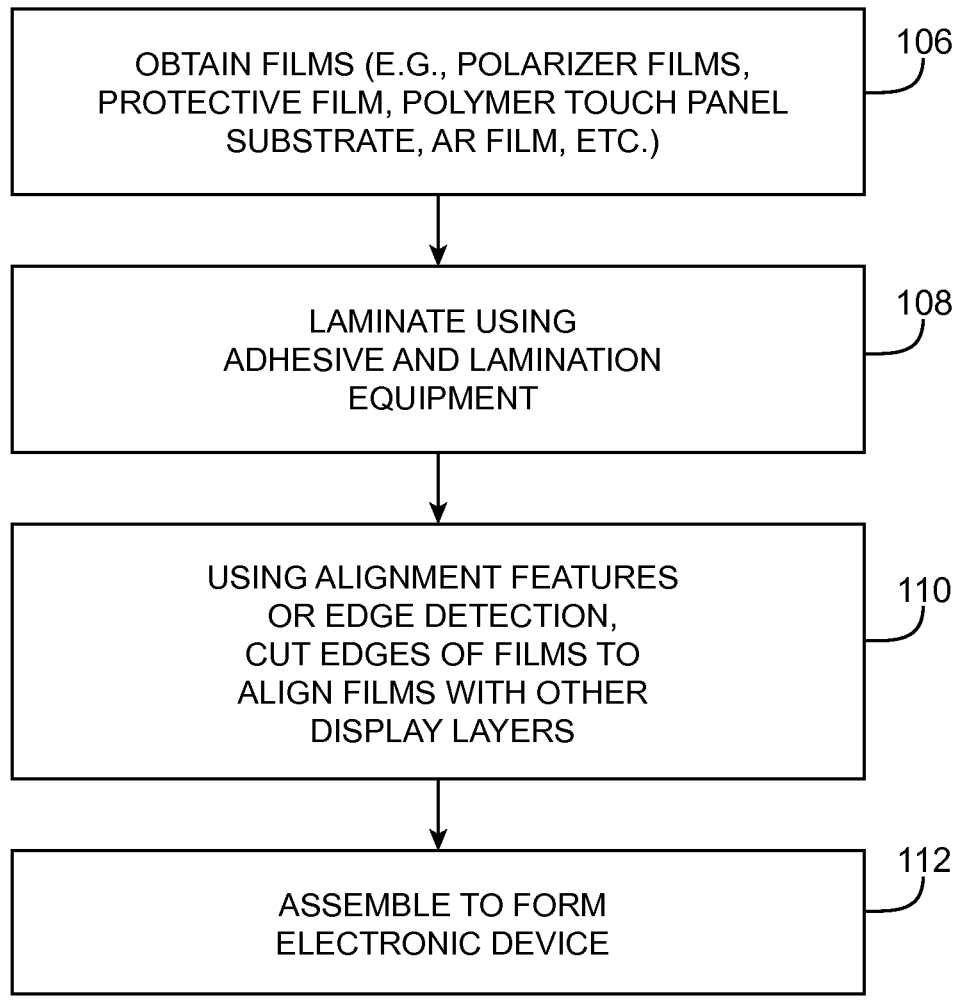
FIG. 15 is a flow chart of illustrative steps involved in using laser processing techniques in forming electronic device structures such as display structures in accordance with an embodiment of the present invention.

FIG. 15 is a flow chart of illustrative steps involved in using laser processing equipment 10 of FIG. 1 in fabricating display structures and other electronic device structures for electronic device 20.

At step 106, layers of material for the electronic device structures such as glass display layers (e.g., layers 18B) and oversized polymer layers (e.g., layers 18A) may be obtained and formed in appropriate sizes. For example, some or all of display layers 18B may be formed using scribe-and-cut techniques or other arrangements suitable for cutting glass substrates (as an example). Layers 18A may be cut to size using die cutting, laser cutting, or other cutting techniques suitable for cutting polymer sheets (as an example).

At step 108, layers 18A and layers 18B may be attached to one another using adhesive or other fastening techniques. For example, layers 18A and 18B may be laminated to one another using interposed layers of adhesive (e.g., pressure sensitive adhesive, optically clear adhesive, thermally cured adhesive, ultraviolet-light-cured adhesive, etc.). Lamination equipment may be used in laminating layers 18A and 18B together.

Following lamination, some of layers 18A will generally overhang edges 56 (i.e., excess portions of layers 18A will protrude over the sides of layers 18B and will not overlap layers 18B). During the operations of step 110, laser processing equipment 10 may use beam shaping and positioning equipment 16 to remove the excess portions of layers 18A or to otherwise use laser beam 14 to shape and cut workpiece 18. Beam shaping and positioning equipment 16 may make adjustments to the lateral and angular position of beam 14 relative to workpiece 18 and adjustments to beam 14 that control the shape of the laser spot on the surface of the workpiece and other laser processing parameters (e.g., the speed of spot movement relative to workpiece 18, the power of laser 12, etc.). Multiple beams 12 may be directed onto workpiece 18 at the same time, if desired (e.g., to form multibeam spots or to process different portions of edge 56 simultaneously to increase throughput).

Following laser processing to trim excess portions of layers 18A from layers 18B of workpiece 18 or to otherwise laser process workpiece 18, workpiece 18 (i.e., a trimmed display) may be installed in an electronic device. For example, a finished display such as display 24 of FIGS. 2A and 2B may be installed in housing 22 of electronic device 20 using electronic device assembly equipment.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of forming electronic device display structures, comprising:
 obtaining at least one display layer; and
 laser cutting through the display layer to form the electronic device display structures, wherein the electronic device display structures comprise at least one glass layer and wherein laser cutting through the display layer comprises laser cutting through the display layer without cutting the glass layer.

2. The method defined in claim 1 wherein obtaining the at least one display layer comprises obtaining at least one polymer display layer and wherein laser cutting through the display layer comprises laser cutting through the polymer display layer.

3. The method defined in claim 1 wherein obtaining the at least one display layer comprises obtaining multiple display layers that are attached to each other and wherein laser cutting through the display layer comprises simultaneously laser cutting through each of the multiple display layers.

4. The method defined in claim 3 further comprising laminating each of the multiple display layers together.

5. The method defined in claim 3 wherein each of the multiple display layers comprises polymer.

6. The method defined in claim 3 wherein the multiple display layers include a polarizer layer.

7. The method defined in claim 1 wherein the display layer comprises a layer selected from the group consisting of: a polarizer layer, a touch sensor substrate layer, an antireflection layer, and a display cover layer.

8. The method defined in claim 1 wherein laser cutting through the display layer comprises applying an infrared laser beam having a wavelength in the range of 1 to 20 microns to the display layer.

9. A method of forming electronic device display structures, comprising:
 obtaining at least one display layer; and
 laser cutting through the display layer to form the electronic device display structures, wherein laser cutting through the display layer comprises applying a laser beam with a spot diameter of 100 microns to 500 microns to the display layer.

10. The method defined in claim 1 wherein laser cutting through the display layer comprises applying a laser beam with an elongated spot shape to the display layer.

11. The method defined in claim 1 wherein laser cutting through the display layer comprises applying a laser beam with a shape that changes as a function of position on the display layer when cutting the display layer.

12. The method defined in claim 1 wherein the at least one display layer comprises at least one polymer layer, wherein the at least one glass layer is attached to the at least one polymer layer, and wherein laser cutting through the display layer comprises cutting the at least one polymer layer without cutting the at least one glass layer.

13. The method defined in claim 12 wherein the at least one glass layer comprises a glass layer selected from the group consisting of: a liquid crystal display color filter array layer, a liquid crystal display thin-film-transistor layer, and a cover glass layer and wherein the at least one polymer layer comprises a polymer layer selected from the group consisting of: a polarizer layer, an antireflection layer, and a polymer touch sensor substrate layer.

14. The method defined in claim 1 wherein the at least one glass layer has an edge and wherein laser cutting the display layer comprises laser cutting along the edge to trim away excess portions of the display layer that do not overlap the glass layer.

15. The method defined in claim 14 further comprising:
 laminating the glass layer and the display layer together using adhesive before laser cutting along the edge to trim away the excess portions of the display layer.

16. A method, comprising:
 forming display structures including at least one glass substrate layer and at least one display layer having portions that overlap the glass substrate layer and having portions that do not overlap the glass substrate layer; and
 with a laser, laser cutting away the portions of the display layer that do not overlap the glass substrate layer, wherein laser cutting away the portions of the display layer comprises applying an infrared laser beam with a spot having at least one lateral dimension of 100 to 500 microns to the display layer.

17. The method defined in claim 16 wherein the display layer comprises a polymer display layer and wherein laser cutting away the portions of the display layer comprises laser cutting away the portions of the polymer display layer.

18. The method defined in claim 17 wherein the glass layer comprises a color filter layer having edges and wherein laser cutting away the portions of the polymer display layer comprises applying the infrared laser beam to the polymer display layer along the edges of the color filter layer.

19. The method defined in claim 18 further comprising:
laminating the polymer display layer to the color filter layer with adhesive before laser cutting away the portions of the polymer display layer.

20. The method defined in claim 16 wherein laser cutting away the portions of the display layer comprises laser cutting away the portions of the display layer using a laser beam with a non-Gaussian intensity profile.

* * * * *